United States Patent [19]

Hatori et al.

[11] Patent Number: 4,929,042
[45] Date of Patent: May 29, 1990

[54] VARIABLE ACOUSTICAL DEFLECTION OF AN OPTICAL WAVE IN AN OPTICAL WAVEGUIDE

[75] Inventors: Masami Hatori; Nobuharu Nozaki; Kozi Kamiyama, all of Kanagawa, Japan

[73] Assignee: Fuji Photo Film Co., Ltd., Kanagawa, Japan

[21] Appl. No.: 127,020

[22] Filed: Nov. 27, 1987

[30] Foreign Application Priority Data

Nov. 28, 1986 [JP] Japan .................................. 61-283646
Jun. 25, 1987 [JP] Japan .................................. 62-158612

[51] Int. Cl.$^5$ ................................................ G02B 6/10
[52] U.S. Cl. ................................ 350/96.13; 350/96.14
[58] Field of Search ................ 350/96.13, 96.14, 96.15

[56] References Cited

U.S. PATENT DOCUMENTS

| | | | |
|---|---|---|---|
| 3,919,669 | 11/1975 | Hartemann | 350/96.13 X |
| 4,425,023 | 1/1984 | Matsumoto et al. | 350/96.13 X |
| 4,455,064 | 6/1984 | Kenan | 350/96.13 |
| 4,470,661 | 9/1984 | Mastsumoto | 350/96.13 |
| 4,595,253 | 6/1986 | Yamashita et al. | 350/96.13 |
| 4,735,476 | 4/1988 | Heffner et al. | 350/96.13 |
| 4,815,802 | 3/1989 | Nakamura | 350/96.13 |

FOREIGN PATENT DOCUMENTS

| | | | |
|---|---|---|---|
| 183626 | 9/1983 | Japan . | |
| 0192232 | 10/1984 | Japan | 350/96.13 |
| 527973 | 1/1975 | U.S.S.R. | 350/96.14 |

OTHER PUBLICATIONS

IEEE Transactions on Circuits and Systems, vol. CA-S-26, No. 12, C. S. Tsai "Guided-Wave Acoustooptic Bragg Modulators for Wide-Band Integrated Optic Communications and Signal Processing" Dec. 1979, pp. 1072-1098.

Primary Examiner—Frank Gonzalez
Assistant Examiner—Phan T. Heartney
Attorney, Agent, or Firm—Sughrue, Mion, Zinn, Macpeak & Seas

[57] ABSTRACT

An optical deflecting apparatus comprises a first generator for generating a first surface acoustic wave which advances to intersect an optical path of a guided optical wave advancing inside of an optical waveguide and diffracts and deflects the guided optical wave, and a second generator for generating a second surface acoustic wave which advances to intersect the optical path of the guided and diffracted optical wave and diffracts and deflects the guided and diffracted optical wave in a direction that amplifies the deflection caused by the diffraction. The first and second surface acoustic wave generators are formed to continuously change the frequencies of the first and second surface acoustic waves and the directions of advance thereof while satisfying the conditions of $lk1 + k1 = lk2$ and $lk2 + k2 = lk3$ wherein $lk1$ and $lk2$ respectively denote wave vectors of the guided optical wave before and after being diffracted by the first surface acoustic wave, $lk3$ denotes the wave vector of the guided optical wave after being diffracted by the second surface acoustic wave, and $lk1$ and $lk2$ respectively denote wave vectors of the first and second surface acoustic waves.

14 Claims, 3 Drawing Sheets

VARIABLE ACOUSTICAL DEFLECTION OF AN OPTICAL WAVE IN AN OPTICAL WAVEGUIDE

BACKGROUND OF THE INVENTION

1. Field of the Invention

This invention relates to an optical deflecting apparatus for generating surface acoustic waves in an optical waveguide and deflecting an optical wave guided through the optical waveguide by diffracting actions of the surface acoustic waves. This invention particularly relates to an optical deflecting apparatus wherein a wide deflection angle range is obtained by deflecting the guided optical wave twice by use of two surface acoustic waves.

2. Description of the Prior Art

As disclosed in, for example, Japanese Unexamined Patent Publication No. 61(1986)-183626, there has heretofore been known an optical deflecting apparatus wherein light is made to enter an optical waveguide formed of a material allowing propagation of a surface acoustic wave therethrough, a surface acoustic wave is generated in a direction intersecting the guided optical wave advancing inside of the optical waveguide to effect Bragg diffraction of the guided optical wave by the surface acoustic wave, and the frequency of the surface acoustic wave is continuously changed to continuously change the angle of diffraction (deflection angle) of the guided optical wave. The optical deflecting apparatus of this type is advantageous in that the apparatus can be fabricated small and light and has high reliability because of the absence of mechanical operating elements as compared with a mechanical type optical deflector such as a galvanometer mirror or a polygon mirror, and an optical deflector using an optical deflecting device such as an electro-optic deflector (EOD) or an acousto-optic deflector (AOD).

However, the aforesaid optical deflecting apparatus has the drawback that the deflection angle cannot be adjusted to be large. Specifically, with the optical deflecting apparatus using the optical waveguide, the optical deflection angle is approximately proportional to the frequency of the surface acoustic wave, and therefore the frequency of the surface acoustic wave must be changed up to a very large value in order to obtain a large deflection angle. Thus it is necessary to change the frequency of the surface acoustic wave over a wide band. Also, in order to satisfy the Bragg condition, it is necessary to control the angle of incidence of the guided optical wave upon the surface acoustic wave by continuously changing (steering) the direction of advance of the surface acoustic wave.

In order to satisfy the aforesaid requirements, as disclosed in, for example, the aforesaid Japanese Unexamined Patent Publication No. 61(1986)-183626, there has heretofore been proposed an optical deflecting apparatus wherein a plurality of interdigital transducers (hereinafter abbreviated as IDT) generating surface acoustic waves, the frequency of which changes continuously in frequency bands different from one another, are disposed so that the directions of generation of the surface acoustic waves are different from one another, and the respective IDTs are operated through switching.

However, the proposed optical deflecting apparatus having the aforesaid configuration has the drawback that the diffraction efficiency decreases around the cross-over frequency of the surface acoustic waves generated by the respective IDTs, and therefore the optical amount of the deflected optical wave fluctuates in accordance with the deflection angle.

Also, with the aforesaid configuration, the IDT which bears the portion of a large deflection angle must ultimately be constituted to be able to generate the surface acoustic wave of a very high frequency. This problem will be described below. The deflection angle $\delta$ of the guided optical wave caused by the acousto-optic interaction between the surface acoustic wave and the guided optical wave is expressed as $\delta = 2\theta$ wherein $\theta$ denotes the angle of incidence of the guided optical wave with respect to the direction of advance of the surface acoustic wave. Also, the formula $$\begin{aligned} 2\theta &= 2\sin^{-1}(\lambda/2Ne \cdot \Lambda) \\ &\simeq \lambda/Ne \cdot \Lambda \\ &= \lambda \cdot f/Ne \cdot v \end{aligned} \quad (1)$$

applies wherein $\lambda$ and $Ne$ respectively denote the wavelength and the effective refractive index of the guided optical wave, and $\Lambda$, $f$ and $v$ respectively denote the wavelength, the frequency and the velocity of the surface acoustic wave. Therefore, a deflection angle range $\Delta(2\theta)$ is expressed as $$\Delta(2\theta) = \Delta f \cdot \lambda / Ne \cdot v.$$

For example, in order to obtain a deflection angle range $\Delta(2\theta)$ equal to 10° in the case where $\lambda = 0.78$ μm, $Ne = 2.2$ and $v = 3,500$ m/s, it is necessary that the frequency range $\Delta f$ of the surface acoustic wave, i.e. the frequency band of the high frequency applied to the IDT, be $\Delta f = 1.72$ GHz. In the case where said frequency band is of one octave so that adverse effects of the second-order diffracted optical wave component can be avoided, the center frequency f0 is equal to 2.57 GHz and the maximum frequency f2 is equal to 3.43 GHz. The period $\Lambda$ of the IDT that gives said maximum frequency f2 is equal to 1.02 μm, and the line width W of the IDT finger is equal to $\Lambda/4 = 0.255$ μm.

With current photolithography and electron beam drawing processes which are popular techniques for forming the IDT, the possible line widths are limited respectively to approximately 0.8 μm and approximately 0.5 μm. Therefore, it is not always possible to form an IDT having the very small line width mentioned above. Even if such an IDT having the very small line width mentioned above could be formed in the future, a driver for generating a high frequency of approximately 3.43 GHz cannot always be manufactured or can only be done at a very high cost. Also, it is not always possible to apply a high voltage to such an IDT. Further, in the case where the frequency of the surface acoustic wave is increased as mentioned above, the wavelength of the surface acoustic wave naturally becomes short, and therefore the surface acoustic wave is readily absorbed by the optical waveguide and the diffraction efficiency deteriorates.

On the other hand, an optical deflecting apparatus wherein, instead of operating a plurality of IDTs through switching as mentioned above, a single IDT is constituted as a curved-finger chirped IDT in which the transducer finger line width is changed continuously and the respective transducer fingers are in a circular arc shape, and the frequency of the surface acoustic wave and the direction of advance thereof are changed continuously over a wide range by the single IDT is disclosed in IEEE Transactions on Circuits and Systems, Vol. CAS-26, No. 12, p. 1072, "Guided-Wave Acoustooptic Bragg Modulators for Wide-Band Integrated Optic Communications and Signal Processing" by C. S. TSAI. With the disclosed configuration, though the drawback with regard to fluctuations of the optical amount of the optical wave in accordance with the deflection angle can be eliminated, the frequency of the surface acoustic wave must still be adjusted to be very high, and therefore the same problems as mentioned above occur.

SUMMARY OF THE INVENTION

The primary object of the present invention is to provide an optical deflecting apparatus wherein no fluctuations in the optical amount of the optical wave as mentioned above are caused, and a wide deflection angle range is obtained even though the frequency of the surface acoustic wave is not adjusted to be very high.

Another object of the present invention is to provide an optical deflecting apparatus which enables decreases in the sizes of the optical scanning recording apparatus and the optical scanning read-out apparatus.

The present invention provides an optical deflecting apparatus comprising:

(i) an optical waveguide formed of a material allowing propagation of surface acoustic waves therethrough, (ii) a first surface acoustic wave generating means for generating a first surface acoustic wave, which advances in a direction intersecting an optical path of a guide optical wave advancing inside of said optical waveguide and diffracts and deflects said guided optical wave, in said optical waveguide, and (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are formed to continuously change the frequencies of said first surface acoustic wave and said second surface acoustic wave and the directions of advance thereof while satisfying the conditions of $|k1|+|K1|=|k2|$, and $|k2|+|K2|=|k3|$ wherein $|k1|$ and $|k2|$ respectively denote wave vectors of the guided optical wave before and after being diffracted by said first surface acoustic wave, $|k3|$ denotes the wave vector of the guided optical wave after being diffracted by said second surface acoustic wave, and $|K1|$ and $|K2|$ respectively denote wave vectors of said first surface acoustic wave and said second surface acoustic wave.

The present invention also provides an optical deflecting apparatus comprising:

(i) an optical waveguide formed of a material allowing propagation of surface acoustic waves therethrough, (ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are operated to continuously change the frequencies of said first surface acoustic wave and said second surface acoustic wave and the directions of advance thereof while satisfying the conditions of $|k1|+|K1|=|k2|$, and $|k2|+|K2|=|k3|$ with the angle of deflection of said guided optical wave by said first surface acoustic wave and said second surface acoustic wave being within the range of δ2 to δ3 (δ2<δ3), wherein $|k1|$ and $|k2|$ respectively denote wave vectors of the guided optical wave before and after being diffracted by said first surface acoustic wave, $|k3|$ denotes the wave vector of the guided optical wave after being diffracted by said second surface acoustic wave, and $|K1|$ and $|K2|$ respectively denote wave vectors of said first surface acoustic wave and said second surface acoustic wave, and in such a range that said deflection angle becomes smaller than δ2, the operation of said second surface acoustic wave generating means is stopped, and said first surface acoustic wave generating means is operated to continuously deflect said guided optical wave within a deflection angle range of δ1 to δ2 (δ1<δ2).

The first surface acoustic wave generating means and the second surface acoustic wave generating means may each be constituted by, for example, a combination of a tilted-finger chirped IDT, in which the transducer finger intervals are changed stepwise and the directions of the transducer fingers are changed stepwise, with a driver for applying an alternating voltage the frequency of which changes continuously to the tilted-finger chirped IDT.

With the first-mentioned optical deflecting apparatus in accordance with the present invention wherein the guided optical wave deflected by the first surface acoustic wave is again deflected by the second surface acoustic wave, a wide deflection angle range can be obtained as a whole even though the frequency bands of the first surface acoustic wave and the second surface acoustic wave are not adjusted to be so wide. Therefore, the optical amount of the deflected optical wave does not fluctuate in accordance with the deflection angle as in the case where a plurality of IDTs are operated through switching. Accordingly, with the first-mentioned optical deflecting apparatus in accordance with the present invention, optical scanning recording or optical scanning read-out can be carried out accurately. Also, since a wide deflection angle range can be obtained as mentioned above, the size of the optical scanning recording apparatus or the optical scanning read-out apparatus can be made small by shortening the distance between the optical deflecting apparatus and the surface which is to be scanned.

With the second-mentioned optical deflecting apparatus in accordance with the present invention wherein the optical wave once diffracted by the first surface acoustic wave is further diffracted by the second surface acoustic wave and such double diffraction is combined with single diffraction, a very wide deflection angle range can be obtained. Therefore, the size of the optical scanning recording apparatus or the optical scanning read-out apparatus can be made small by shortening the distance between the optical deflecting apparatus and the surface which is to be scanned.

Also, with the first-mentioned optical deflecting apparatus and the second-mentioned optical deflecting apparatus in accordance with the present invention wherein a wide deflection angle range can be obtained even though the frequencies of the first and second surface acoustic waves are not adjusted to be markedly high, it is not necessary to adjust the line widths of the IDTs to be extremely small in the case where the IDTs are employed as the surface acoustic wave generating means, and the IDTs for use as the surface acoustic wave generating means can be made easily with the present technique. Also, because of the above, it is not necessary to adjust the frequency of the alternating voltage applied to the IDTs to be markedly high, and therefore the driver for the IDTs can be fabricated easily and at a low cost.

In the case where the optical wave is deflected with the second-mentioned optical deflecting apparatus in accordance with the present invention, the deflection angle range is extended to the small angle side as compared with the case where the optical wave is deflected only with the double diffraction.

In this case, the optical wave that cannot be diffracted by the second surface acoustic wave in the course of the double diffraction may advance within the extended small deflection angle range, depending on the adjustment of the deflection angles δ2 and δ3. Specifically, an unnecessary optical wave is generated within the deflection angle range which is to be utilized as the effective scanning range. However, the diffraction efficiency which can be presently obtained by use of the surface acoustic wave is approximately 90%. Therefore, when the optical amount of the guided optical wave before the guided optical wave intersects the first surface acoustic wave is taken as 1, the optical amount of the double-diffracted optical wave which is to be utilized for optical scanning is equal to 0.9×0.9=0.81. On the other hand, the optical amount of the aforesaid unnecessary optical wave is equal to 0.9×0.1=0.09. Thus the ratio of the optical amount of the optical wave utilized for optical scanning to the optical amount of the unnecessary optical wave is approximately 9:1. In the case where the optical ratio is of this order, recording of a two-valued image can be substantially achieved by use of a photosensitive material which is presently utilized in practice, though recording of a high-gradation image, for example, would not always be possible.

DESCRIPTION OF THE PREFERRED EMBODIMENTS

The present invention will hereinbelow be described in further detail with reference to the accompanying drawings.

Figure 1:
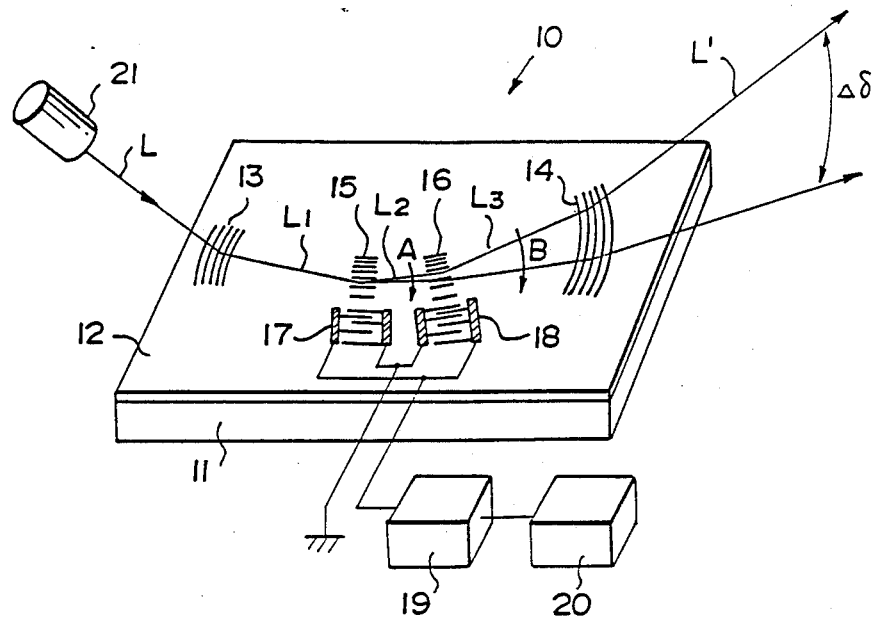
FIG. 1 is a schematic perspective view showing an embodiment of the first optical deflecting apparatus in accordance with the present invention.

Referring to FIG. 1, an optical deflecting apparatus 10 comprises an optical waveguide 12 formed on a substrate 11, a focusing grating coupler (hereinafter abbreviated as FGC) 13 for entry of the optical wave which is formed on the optical waveguide 12, and an FGC 14 for radiation of the optical wave. The optical deflecting apparatus 10 also comprises a first tilted-finger chirped interdigital transducer (the interdigital transducer is hereinbelow abbreviated as IDT) 17 and a second tilted-finger chirped IDT 18 for generating a first surface acoustic wave 15 and a second surface acoustic wave 16 respectively, which advance in directions intersecting the optical path of the guided optical wave advancing between the FGC 13 and the FGC 14, a high-frequency amplifier 19 for applying a high-frequency alternating voltage to the first tilted-finger chirped IDT 17 and the second tilted-finger chirped IDT 18, and a sweeper 20 for continuously changing (sweeping) the frequency of the alternating voltage.

In this embodiment, by way of example, the substrate 11 is formed of a LiNbO$_3$ wafer, and the optical waveguide 12 is formed by overlaying a Ti diffusion film on the surface of the wafer. As the substrate 11, it is also possible to use a crystal substrate formed of sapphire, Si or the like. Besides the Ti diffusion, the optical waveguide 12 may also be formed by sputtering or vacuum evaporation of a different material onto the surface of the substrate 11. Various optical waveguides are described in detail in, for example, T. Tamir, "Integrated Optics", Topics in Applied Physics, Vol. 7, Springer-Verlag, 1975, and Nishibara, et al., "Integrated Optical Circuit", Ohm, 1985. In the present invention, any of the known optical waveguides may be used as the optical waveguide 12. However, the optical waveguide 12 must be formed of a material such as the Ti diffusion film which allows propagation of the surface acoustic waves therethrough. The optical waveguide 12 may also be constituted by two or more layers.

The first tilted-finger chirped IDT 17 and the second tilted-finger chirped IDT 18 may be formed by, for example, coating a positive type electron beam resist onto the surface of the optical waveguide 12, depositing a thin Au conductive film by vacuum evaporation onto the positive type electron beam resist, drawing a transducer pattern with an electron beam, removing the thin Au film, carrying out development, depositing a thin Cr film and a thin Al film by vacuum evaporation, and then carrying out lift-off in an organic solvent. In the case where the substrate 11 and the optical waveguide 12 are made of a piezo-electric material, the first surface acoustic wave 15 and the second surface acoustic wave 16 can also be generated when the first tilted-finger chirped IDT 17 and the second tilted-finger chirped IDT 18 are disposed directly inside of the optical waveguide 12 or on the substrate 11. In other cases, a piezoelectric thin film of ZnO or the like may be formed at a part of the substrate 11 or at a part of the optical waveguide 12 by vacuum evaporation, sputtering, or the like, and the first tilted-finger chirped IDT 17 and the second tilted-finger chirped IDT 18 may be disposed on the piezo-electric thin film.

An optical wave L which is to be deflected is emitted by a light source 21 constituted by a semiconductor laser or the like toward the FGC 13. The optical wave L (divergent wave) is collimated and taken into the optical waveguide 12 by the FGC 13, and is guided inside of the optical waveguide 12. The guided optical wave L1 is diffracted (Bragg diffraction) as shown by the acousto-optic interaction with the first surface acoustic wave 15 generated by the first tilted-finger chirped IDT 17. The guided optical wave L2 thus diffracted and deflected is then diffracted in a direction that amplifies the aforesaid deflection by the acousto-optic interaction with the second surface acoustic wave 16 generated by the second tilted-finger chirped IDT 18. Also, the frequency of the alternating voltage applied to the first tilted-finger chirped IDT 17 is continuously changed as mentioned above, and therefore the frequency of the first surface acoustic wave 15 is changed continuously. As is clear from the Formula (1) shown above, the deflection angle of the guided optical wave L2 after being diffracted by the first surface acoustic wave 15 is approximately proportional to the frequency of the first surface acoustic wave 15. Therefore, as the frequency of the first surface acoustic wave 15 is changed as mentioned above, the guided optical wave L2 is deflected continuously as indicated by the arrow A. The guided optical wave L2 is then deflected by the second surface acoustic wave 16. Also the frequency of the second surface acoustic wave 16 is changed continuously as in the case of the first surface acoustic wave 15, and therefore the guided optical wave L3 after the passage through the second surface acoustic wave 16 is deflected continuously as indicated by the arrow B. The guided optical wave L3 is radiated by the FGC 14 out of the optical waveguide 12, and is converged into a single spot by the converging effects of the FGC 14.

Figure 2:
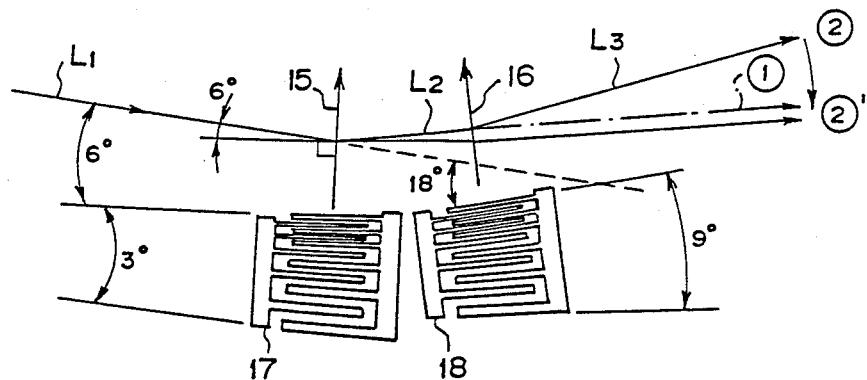
FIG. 2 is an enlarged plan view showing a part of the embodiment shown in FIG. 1, FIGS. 3A and 3B are explanatory views showing the condition of optical wave deflection in accordance with the present invention.

The deflection angle range $\Delta\delta$ of the optical wave L′ radiated out of the optical waveguide 12, i.e. the deflection angle range of the guided optical wave L3, will be described hereinbelow with reference to FIG. 2. FIG. 2 shows the detailed shapes and the arrangement conditions of the first tilted-finger chirped IDT 17 and the second tilted-finger chirped IDT 18. With reference to FIG. 2, the first tilted-finger chirped IDT 17 and the second tilted-finger chirped IDT 18 are each formed so that intervals among the transducer fingers are changed stepwise in a constant change ratio and the directions of the transducer fingers are changed stepwise in a constant change ratio. Both the first tilted-finger chirped IDT 17 and the second tilted-finger chirped IDT 18 are disposed so that the side with the smallest transducer finger interval, i.e. the upper edge side in FIG. 2, faces the guided optical wave side. As the applied voltage is swept as mentioned above, the upper edge sides of the first tilted-finger chirped IDT 17 and the second tilted-finger chirped IDT 18 respectively generate the first surface acoustic wave 15 and the second surface acoustic wave 16 of the maximum frequency $f2=2$ GHz, and the lower edge sides thereof respectively generate the first surface acoustic wave 15 and the second surface acoustic wave 16 of the minimum frequency $f1=1$ GHz. The first tilted-finger chirped IDT 17 has such a shape that the transducer finger on the upper edge side and the transducer finger on the lower edge side are tilted by 3° with respect to each other, and is disposed so that the transducer finger on the upper edge side makes an angle of 6° with respect to the direction of advance of the guided optical wave L1, and the transducer finger on the lower edge side makes an angle of 3° with respect to the direction of advance of the guided optical wave L1. On the other hand, the second tilted-finger chirped IDT 18 has such a shape that the transducer finger on the upper edge side and the transducer finger on the lower edge side are tilted by 9° with respect to each other, and is disposed so that the transducer finger on the upper edge side makes an angle of 18° with respect to the direction of advance of the guided optical wave L1, and the transducer finger on the lower edge side makes an angle of 9° with respect to the direction of advance of the guided optical wave L1. Grounding electrodes of the first tilted-finger chirped IDT 17 and the second tilted-finger chirped IDT 18 may be formed integrally with each other. Also, the tilted-finger chirped IDTs as mentioned above are described in detail in, for example, the aforesaid literature of C. S. TSAI.

Figure 3:
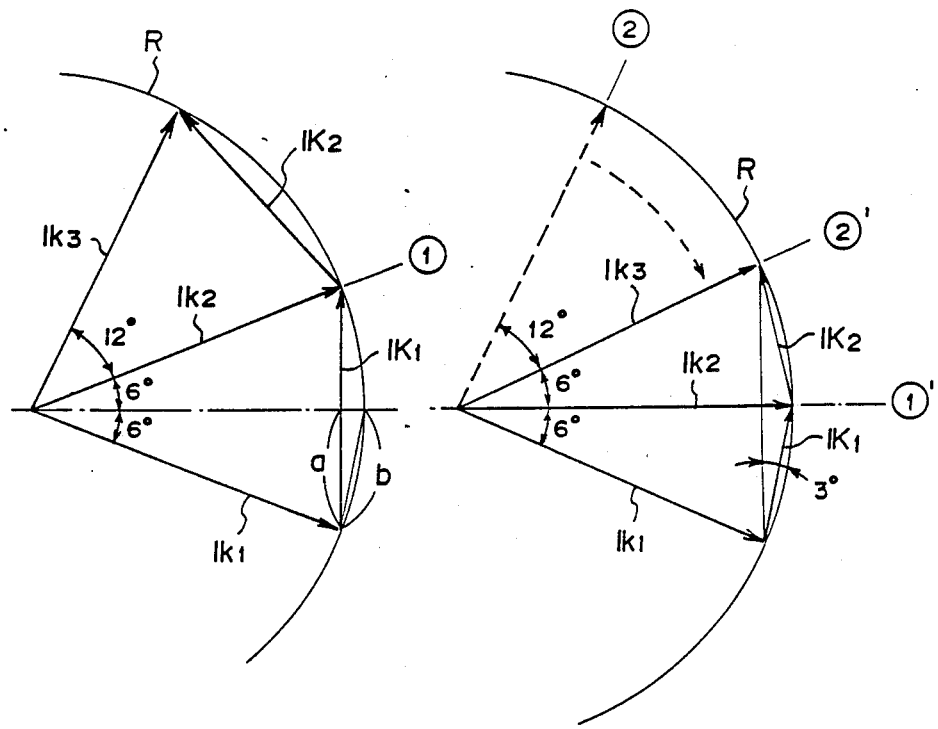

At the time the first surface acoustic wave 15 and the second surface acoustic wave 16 of 2 GHz are generated by the first tilted-finger chirped IDT 17 and the second tilted-finger chirped IDT 18, the condition of diffraction of the guided optical wave becomes as indicated by ② in FIG. 2. In this case, the guided optical wave L1 is incident upon the first surface acoustic wave 15 of 2 GHz at an angle of incidence of 6°, and said angle satisfies the Bragg condition. Specifically, as shown in FIG. 3A, there obtains the formula $$|k1 + |K1 = |k2$$

wherein |k1 and |k2 respectively denote the wave vector of the guided optical wave L1 and the wave vector of the guided optical wave L2 after being diffracted, and |K1 denotes the wave vector of the first surface acoustic wave 15. Thus the direction of advance of the guided optical wave L2 after being diffracted becomes equal to the direction of the vector |k2 (deflection angle $\delta = 2\theta = 12°$). Also, at this time, the second surface acoustic wave 16 of 2 GHz is excited by the transducer finger on the upper edge side of the second tilted-finger chirped IDT 18 in FIG. 2 (said transducer finger makes an angle of 12° with respect to the transducer finger on the upper edge side of the first tilted-finger chirped IDT 17), and advances normal to said transducer finger. Therefore, the angle of incidence of the guided optical wave L2 with respect to the second surface acoustic wave 16 is 6°, the second surface acoustic wave 16 has the same wavelength as the wavelength of the first surface acoustic wave 15, and thus the Bragg condition is satisfied. Specifically, as shown in FIG. 3A, there obtains the formula $$k2 + K2 = k3$$

wherein |k3 denotes the wave vector of the guided optical wave L3 after being diffracted by the second surface acoustic wave 16, and K2 denotes the wave vector of the second surface acoustic wave 16.

From the aforesaid condition, the frequency of the first surface acoustic wave 15 and the frequency of the second surface acoustic wave 16 are decreased gradually to 1 GHz. The magnitude |K1| and the magnitude |K2| of the wave vectors of the first surface acoustic wave 15 and the second surface acoustic wave 16 are equal to $2\pi/\Lambda$ wherein $\Lambda$ denotes the wavelengths of the first surface acoustic wave 15 and the second surface acoustic wave 16, and consequently are proportional to the frequency of the first surface acoustic wave 15 and the frequency of the second surface acoustic wave 16. Therefore, at the time the frequency of the first surface acoustic wave 15 and the frequency of the second surface acoustic wave 16 are 1 GHz, the magnitude of the wave vector |K1 of the first surface acoustic wave 15 and the magnitude of the wave vector |K2 of the second surface acoustic wave 16 become one-half of the values at the time the frequencies are 2 GHz. Also, in this case, since the transducer finger of the first tilted-finger chirped IDT 17 for exciting the first surface acoustic wave 15 of 1 GHz is tilted by 3° with respect to the transducer finger thereof for exciting the first surface acoustic wave 15 of 2 GHz and the transducer finger of the second tilted-finger chirped IDT 18 for exciting the second surface acoustic wave 16 of 1 GHz is tilted by 9° with respect to the transducer finger thereof for exciting the second surface acoustic wave 16 of 2 GHz, the directions of advance of the first surface acoustic wave 15 and the second surface acoustic wave 16, i.e. the directions of the wave vectors |K1 and |K2, change by 3° and 9° respectively from the directions of the wave vectors |K1 and |K2 of the first surface acoustic wave 15 and the second surface acoustic wave 16 of 2 GHz. Also, a≈b in FIG. 3A, and consequently the wave vectors |K1 and |K2 in the case where the frequencies of the first surface acoustic wave 15 and the second surface acoustic wave 16 are 1 GHz become as shown in FIG. 3B.

As mentioned above, the aforesaid formulas $|k1 + |K1 = |k2$, and $|k2 + |K2 = |k3$ also obtain in the case where the frequencies of the first surface acoustic wave 15 and the second surface acoustic wave 16 are 1 GHz.

Also, the magnitude |k1 of the wave vector |k1 is equal to $n.2\pi/\lambda$ wherein $\lambda$ denotes the wavelength of the guided optical wave L1 and n denotes the refractive index. Said wavelength is the same also for the guided optical waves L2 and L3, and therefore the formula $||k1| = ||k2| = ||k3|$ always holds. On the other hand, the wave vector |K1 of the first surface acoustic wave 15 is expressed as $2\pi/\Lambda$ wherein $\Lambda$ denotes the wavelength of the first surface acoustic wave 15, and said wavelength is always equal to the wavelength of the second surface acoustic wave 16. Therefore, the formula $||K1| = ||K2|$ holds. Also, as mentioned above, the directions of the wave vectors |K1 and |K2 change in constant change ratios intrinsic to the first surface acoustic wave 15 and the second surface acoustic wave 16 at the time the frequencies of the first surface acoustic wave 15 and the second surface acoustic wave 16 are changed from 2 GHz to 1 GHz. Therefore, the aforesaid relationships $|k1 + |K1 = |k2$, and $|k2 + |K2 = |k3$ always hold and the Bragg condition between the guided optical wave L1 and the first surface acoustic wave 15 and the Bragg condition between the guided optical wave L2 and the second surface acoustic wave 16 are always satisfied as long as the frequencies of the first surface acoustic wave 15 and the second surface acoustic wave 16 are being changed from 2 GHz to 1 GHz as mentioned above.

As is clear from the above, the direction of advance of the guided optical wave L3 after being diffracted twice coincides with the direction of the vector |k3 is shown in FIG. 3A, i.e. the direction indicated by ② in FIG. 2, at the time the frequencies of the first surface acoustic wave 15 and the second surface acoustic wave 16 are 2 GHz, and coincides with the direction of the vector k3 as shown in FIG. 3B, i.e. the direction indicated by ②' in FIG. 2, at the time the frequencies of the first surface acoustic wave 15 and the second surface acoustic wave 16 are 1 GHz. The difference between the direction of the vector |k3 as shown in FIG. 3A and the direction of the vector |k3 as shown in FIG. 3B is 24° − 12° = 12°. That is, with this embodiment, a wide deflection angle range of 12° is obtained. On the other hand, in the case where optical wave deflection is carried out by use of a single surface acoustic wave the frequency of which changes from 1 GHz to 2 GHz (the frequency band is of one octave so that the adverse effects of the second-order diffracted optical wave component can be avoided), a deflection angle range of only 6° is obtained.

When the frequencies of the first surface acoustic wave 15 and the second surface acoustic wave 16 are further decreased below 1 GHz, the guided optical wave L3 is deflected further from the position as indicated by ②' in FIG. 3B. However, at this position, the guided optical wave L2 diffracted once is slightly radiated at the time of 2 GHz frequency. Therefore, the range of ② to ②' as shown in FIG. 3B should preferably be utilized as the optical wave deflection range as in the aforesaid embodiment.

Instead of continuously changing the frequencies of the first surface acoustic wave 15 and the second surface acoustic wave 16 from 2 GHz to 1 GHz, they may be changed conversely from 1 GHz to 2 GHz. In this case, only the direction of deflection of the optical wave L' is reversed. Also, in the case where said frequencies are changed in a mode of 2 GHz→1 GHz→2 GHz→1 GHz, the optical wave L' is deflected both ways and reciprocal optical wave scanning can be achieved.

In the aforesaid embodiment, the angle of incidence of the guided optical wave L1 with respect to the first surface acoustic wave 15 having a frequency of 2 GHz, i.e. the angle between the direction of advance of the guided optical wave L1 and the transducer finger of the first tilted-finger chirped IDT 17 that excites 2 GHz, is adjusted to 6°, and the angle between the direction of advance of the guided optical wave L1 and the transducer finger of the first tilted-finger chirped IDT 17 that excites 1 GHz is adjusted to 3°. On the other hand, the angle between the direction of advance of the guided optical wave L1 and the transducer finger of the second tilted-finger chirped IDT 18 that excites 2 GHz is adjusted to 18°, and the angle between the direction of advance of the guided optical wave L1 and the transducer finger of the second tilted-finger chirped IDT 18 that excites 1 GHz is adjusted to 9°. In general, in the case where the minimum frequency and the maximum frequency of the first surface acoustic wave 15 and the second surface acoustic wave 16 are respectively f1 and f2 (f2=2f1), the aforesaid Bragg condition can always be satisfied when the angles adjusted to 6°, 3°, 18° and 9° in the aforesaid embodiment are respectively adjusted to $\theta$, $\theta/2$, $3\theta$ and $3\theta/2$. This will be apparent from FIGS. 3A and 3B.

Also, in the case where the shapes of the first tilted-finger chirped IDT 17 and the second tilted-finger chirped IDT 18 are adjusted to the shapes defined by the aforesaid angle $\theta$, the minimum frequency f1 and the maximum frequency f2 of the first surface acoustic wave 15 and the second surface acoustic wave 16 need not necessarily be adjusted so that f2=2f1, and the maximum frequency f2 may be adjusted to a value slightly smaller than 2f1, for example. However, in the case where the first tilted-finger chirped IDT 17 and the second tilted-finger chirped IDT 18 are formed in the shapes mentioned above, the advantages of their shapes should be utilized to the maximum extent, and the frequencies of the first surface acoustic wave 15 and the second surface acoustic wave 16 should preferably be changed within the range of f1 to f2=2f1, which range is free of entry of the second-order diffracted optical wave component generated at the time of the minimum frequency of f1 and provides the maximum deflection angle range.

Also, in the first optical deflecting apparatus in accordance with the present invention, the minimum frequency f1 and the maximum frequency f2 of the first surface acoustic wave 15 and the second surface acoustic wave 16 need not necessarily be adjusted so that f2=2f1, and the frequencies of the first surface acoustic wave 15 and the second surface acoustic wave 16 need not necessarily be changed so that they are always equal to each other. Also, when the frequencies and the directions of advance of the first surface acoustic wave 15 and the second surface acoustic wave 16 are changed independently of each other, the aforesaid relationships

|k1+|K1=|k2, and

|k2+|K2=|k3, can be satisfied through the shapes and arrangement conditions of the first tilted-finger chirped IDT 17 and the second tilted-finger chirped IDT 18.

However, the frequencies of the first surface acoustic wave 15 and the second surface acoustic wave 16 should preferably be changed so that they are always equal to each other. In this case, the two tilted-finger chirped IDTs can be operated by a single common driver, and said operation method is advantageous from the viewpoint of cost since the driver is usually expensive.

Figure 4:
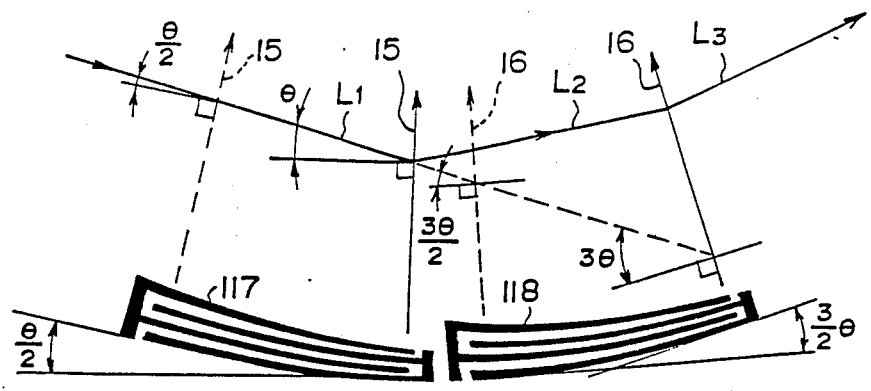
FIG. 4 is a plan view showing different examples of the first and second surface acoustic wave generating means used in accordance with the present invention.

In the present invention, instead of using the tilted-finger chirped IDTs 17 and 18 as mentioned above, curved-finger chirped IDTs wherein the intervals among the transducer fingers are changed stepwise and the respective transducer fingers are in a circular arc shape may be used to change the frequencies and the directions of advance of the first and second surface acoustic waves. FIG. 4 shows an example of the arrangement of such curved-finger chirped IDTs. In this embodiment, a first curved-finger chirped IDT 117 and a second curved-finger chirped IDT 118 are constituted so that the transducer finger portions at the right end in FIG. 4 generate the first surface acoustic wave 15 and the second surface acoustic wave 16 having the maximum frequency f2, and the transducer finger portions at the left end generate the first surface acoustic wave 15 and the second surface acoustic wave 16 having the minimum frequency f1, as indicated by the broken lines. Also in this case, in order to ensure that f2=2f1, the first curved-finger chirped IDT 117 and the second curved-finger chirped IDT 118 should be constituted and disposed so that the transducer finger portion at the left end of the first curved-finger chirped IDT 117 makes an angle of $\theta/2$ with respect to the direction of advance of the guided optical wave L1, wherein $\theta$ denotes the angle of incidence of the guided optical wave L1 with respect to the first surface acoustic wave 15 having the maximum frequency f2, and the transducer finger portions at the right end and the left end respectively of the second curved-finger chirped IDT 118 make an angle of $3\theta$ and an angle of $3\theta/2$ with respect to the direction of advance of the guided optical wave L1.

In the case where, instead of the optical waveguide 12 comprising the LiNbO$_3$ wafer and the Ti diffusion film overlaid on the wafer, an optical waveguide formed of ZnO is used as the optical waveguide 12, a deflection angle range of approximately $\Delta\delta=8°$ can be obtained when the maximum frequency and the minimum frequency of the first surface acoustic wave 15 and the second surface acoustic wave 16 are adjusted respectively to 1.0 GHz and 0.5 GHz, for example.

Also, three or more surface acoustic waves may be propagated through the optical waveguide, and the guided optical wave may be diffracted and deflected three times or more by the surface acoustic waves. Moreover, with the optical deflecting apparatus having such a configuration, the same effects as mentioned above can be obtained by the two adjacent surface acoustic waves, and therefore the optical deflecting apparatus of this type is also embraced in the scope of the optical deflecting apparatus in accordance with the present invention.

Furthermore, instead of the aforesaid FGC 13 and the FGC 14, a coupler prism or the like may be used for the entry of the optical wave into the optical waveguide 12 and the radiation thereof out of the optical waveguide 12, or the optical wave may be directly entered into and radiated out of the edge faces of the optical waveguide 12. In order to convert the divergent optical wave L into the collimated optical wave and to converge the optical wave L' radiated out of the optical waveguide 12, it is possible to use an optical waveguide lens and an ordinary external lens.

Figure 5:
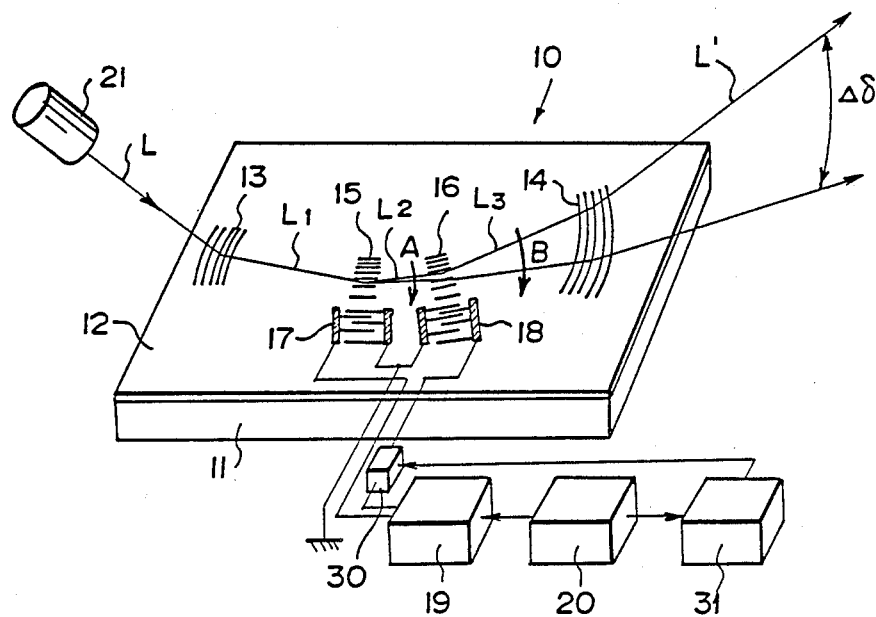
FIG. 5 is a schematic perspective view showing an embodiment of the second optical deflecting apparatus in accordance with the present invention.

FIG. 5 shows an embodiment of the second optical deflecting apparatus in accordance with the present invention. In FIG. 5, similar elements are numbered with the same reference numerals with respect to FIG. 1. In the optical deflecting apparatus 10 shown in FIG. 5, a switch 30 for interrupting the application of the alternating voltage to the second tilted-finger chirped IDT 18 is disposed between the second tilted-finger chirped IDT 18 and the high-frequency amplifier 19. The switch 30 is opened and closed by a control circuit 31 in synchronization with the frequency sweep timing of the sweeper 20.

As long as the switch 30 is closed and the alternating voltage is being applied to the second tilted-finger chirped IDT 18, the guided optical wave L2 diffracted and deflected by the acousto-optic interaction with the first surface acoustic wave 15 generated by the first tilted-finger chirped IDT 17 is then diffracted in a direction that amplifies the aforesaid deflection by the acousto-optic interaction with the second surface acoustic wave 16 generated by the second tilted-finger chirped IDT 18. Also, as mentioned above, the guided optical wave L3 after the passage through the second surface acoustic wave 16 is deflected continuously, as indicated by the arrow B As will be described in detail later, the alternating voltage generated by the high-frequency amplifier 19 is continuously swept by the sweeper 20 from the maximum frequency to the minimum frequency. After the alternating voltage is swept to the minimum frequency, it is returned to the maximum frequency, and the same sweep operation is repeated. The control circuit 31 opens the switch 30 in the course of the sweep period for alternate sweep operations. Specifically, after the swept alternating voltage has been applied to the first tilted-finger chirped IDT 17 and the second tilted-finger chirped IDT 18, the alternating voltage is applied to the first tilted-finger chirped IDT 17 alone, and then is applied to both the first tilted-finger chirped IDT 17 and the second tilted-finger chirped IDT 18, as mentioned above. These voltage applying operations are repeated. Therefore, after the guided optical wave L1 has been diffracted and deflected by the first surface acoustic wave 15 and the second surface acoustic wave 16 as mentioned above, generation of the second surface acoustic wave 16 is stopped. At this time, the guided optical wave L1 is deflected by the first surface acoustic wave 15 alone. Thereafter, the guided optical wave L1 is again deflected by both the first surface acoustic wave 15 and the second surface acoustic wave 16. The deflection angle range of the guided optical wave L1 by the first surface acoustic wave 15 alone and the deflection angle range of the guided optical wave L1 by both the first surface acoustic wave 15 and the second surface acoustic wave 16 are adjacent to each other. Accordingly, the ultimate deflection angle range is equal to the sum of these two deflection angle ranges, as will be described in detail later.

The guided optical wave L2 deflected by the first surface acoustic wave 15 alone or the guided optical wave L3 deflected by both the first surface acoustic wave 15 and the second surface acoustic wave 16 is radiated by the FGC 14 out of the optical waveguide 12, and is converged into a single spot by the converging effects of the FGC 14.

The deflection angle range $\Delta\delta$ of the optical wave L' radiated out of the optical waveguide 12 in the embodiment shown in FIG. 5 will be described hereinbelow with reference to FIGS. 2, 3A and 3B. As mentioned above, at the time the first surface acoustic wave 15 and the second surface acoustic wave 16 of 2 GHz are generated by the first tilted-finger chirped IDT 17 and the second tilted-finger chirped IDT 18, the condition of diffration of the guided optical wave becomes as indicated by ② in FIG. 2. Also, as shown in FIG. 3A, there obtains the formula $$|k1+|K1=|k2$$

wherein $|k1$ and $|k2$ respectively denote the wave vector of the guided optical wave L1 and the wave vector of the guided optical wave L2 after being diffracted, and $|K1$ denotes the wave vector of the first surface acoustic wave 15. Thus the direction of advance of the guided optical wave L2 after being diffracted becomes equal to the direction of the vector $|k2$ (deflection angle=$2\theta=12°$). Also, at this time, as shown in FIG. 3A, there obtains the formula $$|k2+|K2=|k3$$

wherein k3 denotes the wave vector of the guided optical wave L3 after being diffracted by the second surface acoustic wave 16 of 2 GHz, and K2 denotes the wave vector of the second surface acoustic wave 16. At this time, $\delta3=24°$ wherein $\delta3$ denotes the deflection angle of the guided optical wave L3 with respect to the guided optical wave L1.

From the aforesaid condition, the frequency of the first surface acoustic wave 15 and the frequency of the second surface acoustic wave 16 are decreased gradually to 1 GHz. As mentioned above, the wave vectors K1 and K2 in the case where the frequencies of the first surface acoustic wave 15 and the second surface acoustic wave 16 are 1 GHz become as shown in FIG. 3B. At this time, $\delta2=12°$ wherein $\delta2$ denotes the deflection angle of the guided optical wave L3 with respect to the guided optical wave L1.

As mentioned above, the direction of advance of the guided optical wave L3 after being diffracted twice coincides with the direction of the vector $|k3$ as shown in FIG. 3A, i.e. the direction indicated by ② in FIG. 2, at the time the frequencies of the first surface acoustic wave 15 and the second surface acoustic wave 16 are 2 GHz, and coincides with the direction of the vector $|k3$ as shown in FIG. 3B, i.e. the direction indicated by ②' in FIG. 2, at the time the frequencies of the first surface acoustic wave 15 and the second surface acoustic wave 16 are 1 GHz. The difference between the direction of the vector k3 as shown in FIG. 3A and the direction of the vector k3 as shown in FIG. 3B is $24°-12°=12°$. That is, a wide deflection angle range of 12° is obtained through the double diffraction by the first surface acoustic wave 15 and the second surface acoustic wave 16.

After the frequencies of the first surface acoustic wave 15 and the second surface acoustic wave 16 are changed continuously as mentioned above, generation of the second surface acoustic wave 16 is interrupted, the first surface acoustic wave 15 alone is generated, and the frequency of the first surface acoustic wave 15 is changed continuously from 2 GHz to 1 GHz. Therefore, in this case the direction of deflection of the optical wave L' radiated out of the optical waveguide 12 at the time the frequency of the first surface acoustic wave 15 is 2 GHz coincides with the direction of deflection of the guided optical wave L2, i.e. the direction of the vector k2 as shown in FIG. 3A. This direction is the same as the direction of ② ' shown in FIG. 3B, i.e. the direction of deflection of the optical wave L' at the time both the frequencies of the first surface acoustic wave 15 and the second surface acoustic wave 16 are 1 GHz. When the frequency of the first surface acoustic wave 15 is changed continuously to 1 GHz from this condition, the guided optical wave L2 is deflected continuously, as indicated by the arrow A in FIG. 5. At the time the frequency of the first surface acoustic wave 15 is 1 GHz, the direction of deflection of the guided optical wave L2, i.e. the direction of deflection of the optical wave L', becomes equal to the direction of the vector |k2, as shown in FIG. 3B. At this time, $\delta 1 = 6°$ wherein $\delta 1$ denotes the deflection angle of the guided optical wave L2 with respect to the guided optical wave L1. That is, a deflection angle range of $\delta 1 = 6°$ is obtained by the diffraction of the guided optical wave L1 by the first surface acoustic wave 15 alone. Therefore, with the embodiment shown in FIG. 5, a very wide deflection angle range of $12° + 6° = 18°$ is obtained by the combination of the double diffraction of the guided optical wave by the first surface acoustic wave 15 and the second surface acoustic wave 16 with the single diffraction of the guided optical wave by the first surface acoustic wave 15 alone.

In the case where the first surface acoustic wave 15 and the second surface acoustic wave 16 advance at an interval therebetween, the optical path of the guided optical wave L2 deflected by the first surface acoustic wave 15 of 2 GHz alone is at the position indicated by ① in FIG. 2, which position is slightly deviated from the optical path of the guided optical wave L3 deflected by the first surface acoustic wave 15 and the second surface acoustic wave 16 of 1 GHz. However, the deviation in the optical path can be decreased to a practically acceptable extent by making the path of advance of the first surface acoustic wave 15 and the path of advance of the second surface acoustic wave 16 as close to each other as possible. Or, the aforesaid deviation may be maintained unremoved, and the maximum frequency of the first surface acoustic wave 15 in the course of the single diffraction may be decreased slightly below 2 GHz as an adjustment so that the optical wave scanning position at the minimum deflection angle in the course of the double diffraction and the optical wave scanning position at the maximum deflection angle in the course of the single diffraction are adjacent to each other on the surface which is to be scanned.

In the deflection angle range obtained by the single diffraction, i.e. in the range of ②' to ①' in FIG. 3B, the unnecessary optical wave which could not be diffracted by the second surface acoustic wave 16 in the course of the double diffraction of the guided optical wave L1 is radiated, though slightly. However, as mentioned above, no problem arises with regard to such unnecessary optical wave insofar as the optical deflecting apparatus is used for optical wave scanning recording or read-out of a two-valued image.

In the second optical deflecting apparatus in accordance with the present invention, the minimum frequency of the first surface acoustic wave 15 in the course of the single diffraction need not necessarily be adjusted to be equal to the minimum frequency f1 of the first surface acoustic wave 15 in the course of the double diffraction.

In the case where, instead of the optical waveguide 12 comprising the LiNbO$_3$ wafer and the Ti diffusion film overlaid on the wafer, an optical waveguide formed of ZnO is used as the optical waveguide 12, a deflection angle range of approximately $\Delta\delta = 12°$ can be obtained when the maximum frequency and the minimum frequency of the first surface acoustic wave 15 and the second surface acoustic wave 16 are adjusted respectively to 1.0 GHz and 0.5 GHz, for example, in the embodiment shown in FIG. 5.

We claim:
1. An optical deflecting apparatus comprising:
    (i) an optical waveguide formed of a material allowing propagation of surface acoustic waves therethrough,
    (ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and
    (iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide,
    wherein said first surface acoustic wave generating means and said second surface acoustic wave generating means are formed to continuously change the frequencies of said first surface acoustic wave and said second surface acoustic wave and the directions of advance thereof while satisfying the conditions of

$|k1 + |K1 = |k2$, and $|k2 + |K2 = |k3$ wherein |k1 and |k2 respectively denote wave vectors of the guided optical wave before and after being diffracted by said first surface acoustic wave, |k3 denotes a wave vector of the guided optical wave after being diffracted by said second surface acoustic wave, and |K1 and |K2 respectively denote wave vectors of said first surface acoustic wave and said second surface acoustic wave.

2. An apparatus as defined in claim 1 wherein each of (1) said first surface acoustic wave generating means and (2) said second surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

3. An apparatus as defined in claim 1 wherein each of (1) said first surface acoustic wave generating means and (2) said second surface acoustic wave generating means comprises a curved-finger chirped interdigital transducer, in which transducer finger intervals are changed stepwise and the respective transducer fingers are in a circular arc shape, and a driver for applying an alternating voltage the frequency of which changes continuously to said curved-finger chirped interdigital transducer.

4. An apparatus as defined in claim 2 wherein said first surface acoustic wave generating means and said second surface acoustic wave generating means are constituted to generate surface acoustic waves the frequencies of which change while attaining values equal to each other in a frequency range of f1 to f2, wherein $f2 \approx 2f1$, said chirped interdigital transducer which constitutes said first surface acoustic wave generating means is formed so that a transducer finger at a portion for generating said first surface acoustic wave having the frequency f1 makes an angle of $\theta/2$ with respect to a direction of advance of a guided optical wave L1 incident upon said first surface acoustic wave, wherein $\theta$ denotes an angle of incidence of said guided optical wave L1 with respect to said first surface acoustic wave having the frequency f2, and said chirped interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1.

5. An apparatus as defined in claim 3 wherein said first surface acoustic wave generating means and said second surface acoustic wave generating means are constituted to generate surface acoustic waves the frequencies of which change while attaining values equal to each other in a frequency range of f1 to f2, wherein $f2 \simeq 2f1$, said chirped interdigital transducer which constitutes said first surface acoustic wave generating means is formed so that a transducer finger at a portion for generating said first surface acoustic wave having the frequency f1 makes an angle of $\theta/2$ with respect to a direction of advance of a guided optical wave L1 incident upon said first surface acoustic wave, wherein $\theta$ denotes the angle of incidence of said guided optical wave L1 with respect to said first surface acoustic wave having the frequency f2, and said chirped interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1.

6. An apparatus as defined in claim 4 or 5 wherein said chirped interdigital transducers which respectively constitute said first surface acoustic wave generating means and said second surface acoustic wave generating means are operated by a single common driver.

7. An optical deflecting apparatus comprising:
(i) an optical waveguide formed of a material allowing propagation of surface acoustic waves therethrough,
(ii) a first surface acoustic wave generating means for generating a first surface acoustic wave, which advances in a direction intersecting an optical path of a guided optical wave advancing inside of said optical waveguide and diffracts and deflects said guided optical wave, in said optical waveguide, and
(iii) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide, wherein said first surface acoustic wave generating means and said second surface acoustic wave generating means are operated to continuously change the frequencies of said first surface acoustic wave and said second surface acoustic wave and the directions of advance thereof while satisfying the conditions of $|k1+K1|=|k2|$, and $|k2+K2|=|k3|$ with the angle of deflection of said guided optical wave by said first surface acoustic wave and said second surface acoustic wave being within the range of $\delta 2$ to $\delta 3$ ($\delta 2 < \delta 3$), wherein $|k1|$ and $|k2|$ respectively denote wave vectors of the guided optical wave before and after being diffracted by said first surface acoustic wave, $|k3|$ denotes the wave vector of the guided optical wave after being diffracted by said second surface acoustic wave, and $|K1|$ and $|K2|$ respectively denote wave vectors of said first surface acoustic wave and said second surface acoustic wave, and in such a range that said deflection angle becomes smaller than $\delta 2$, the operation of said second surface acoustic wave generating means is stopped, and said first surface acoustic wave generating means is operated to continuously deflect said guided optical wave within a deflection angle range of $\delta 1$ to $\delta 2$ ($\delta 1 < \delta 2$).

8. An apparatus as defined in claim 7 wherein each of said first surface acoustic wave generating means and said second surface acoustic wave generating means comprises a tilted-finger chirped interdigital transducer, in which transducer finger intervals are changed stepwise and the directions of the transducer fingers are changed stepwise, and a driver for applying an alternating voltage the frequency of which changes continuously to said tilted-finger chirped interdigital transducer.

9. An apparatus as defined in claim 7 wherein each of said first surface acoustic wave generating means and said second surface acoustic wave generating means comprises a curved-finger chirped interdigital transducer, in which transducer finger intervals are changes stepwise and the respective transducer fingers are in a circular arc shape, and a driver for applying an alternating voltage the frequency of which changes continuously to said curved-finger chirped interdigital transducer.

10. An apparatus as defined in claim 8 wherein said first surface acoustic wave generating means and said second surface acoustic wave generating means are constituted to generate surface acoustic waves the frequencies of which change while attaining values equal to each other in a frequency range of f1 to f2, wherein $f2 \simeq 2f1$, with said angle of deflection of said guided optical wave being within the range of $\delta 2$ to $\delta 3$, said chirped interdigital transducer which constitutes said first surface acoustic wave generating means is formed so that the transducer finger at a portion for generating said first surface acoustic wave having the frequency f1 makes an angle of $\theta/2$ with respect to a direction of advance of a guided optical wave L1 incident upon said first surface acoustic wave, wherein $\theta$ denotes the angle of incidence of said guided optical wave L1 with respect to said first surface acoustic wave having the frequency f2, said chirped interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1, and said first surface acoustic wave generating means is formed to generate a surface acoustic wave the frequency of which changes within a frequency range of f0 to f2, wherein f0<f2, at the time the operation of said second surface acoustic wave generating means is being stopped.

11. An apparatus as defined in claim 10 wherein said frequency f0 is equal to said frequency f1.

12. An apparatus as defined in claim 9 wherein said first surface acoustic wave generating means and said second surface acoustic wave generating means are constituted to generate surface acoustic waves the frequencies of which change while attaining values equal to each other in a frequency range of f1 to f2, wherein f2≃2f1, with said angle of deflection of said guided optical wave being within the range of δ2 to δ3, said chirped interdigital transducer which constitutes said first surface acoustic wave generating means is formed so that the transducer finger at a portion for generating said first surface acoustic wave having the frequency f1 makes an angle of $\theta/2$ with respect to the direction of advance of the guided optical wave L1 incident upon said first surface acoustic wave, wherein $\theta$ denotes the angle of incidence of said guided optical wave L1 with respect to said first surface acoustic wave having the frequency f2, said chirped interdigital transducer which constitutes said second surface acoustic wave generating means is formed so that the transducer fingers at portions for generating said second surface acoustic wave having the frequency f2 and said second surface acoustic wave having the frequency f1 respectively make an angle of $3\theta$ and an angle of $3\theta/2$ with respect to the direction of advance of said guided optical wave L1, and said first surface acoustic wave generating means is formed to generate a surface acoustic wave the frequency of which changes within a frequency range of f0 to f2, wherein f0<f2, at the time the operation of said second surface acoustic wave generating means is being stopped.

13. An apparatus as defined in claim 12 wherein said frequency f0 is equal to said frequency f1.

14. An apparatus as defined in claim 11 or 13 wherein said chirped interdigital transducers which respectively constitute said first surface acoustic wave generating means and said second surface acoustic wave generating means are operated by a single common driver.

* * * * *